US012655871B2

(12) United States Patent

Ke et al.

(10) Patent No.: US 12,655,871 B2

(45) Date of Patent: Jun. 16, 2026

(54) SELF-DEHUMIDIFYING HYDROSTATIC GAS BEARING

(71) Applicant: Wuhan Second Ship Design and Research Institute, Wuhan (CN)

(72) Inventors: Zhiwu Ke, Wuhan (CN); Zhenxing Zhao, Wuhan (CN); Hanbing Ke, Wuhan (CN); Can Ma, Wuhan (CN); Kelong Zhang, Wuhan (CN); Yuansheng Lin, Wuhan (CN); Weijian Lv, Wuhan (CN); Lu Dai, Wuhan (CN); Shaodan Li, Wuhan (CN); Tao He, Wuhan (CN); Yong Liu, Wuhan (CN); Xiaohu Yang, Wuhan (CN); Guangzhan Xu, Wuhan (CN); Ping Song, Wuhan (CN); Zhaoli Zheng, Wuhan (CN)

(73) Assignee: Wuhan Second Ship Design and Research Institute, Wuhan (CN)

( * ) Notice: Subject to any disclaimer, the term of this patent is extended or adjusted under 35 U.S.C. 154(b) by 41 days.

(21) Appl. No.: 18/788,495

(22) Filed: Jul. 30, 2024

(65) Prior Publication Data

US 2025/0198459 A1 Jun. 19, 2025

(30) Foreign Application Priority Data

Dec. 14, 2023 (CN) .......................... 202311726070.0

(51) Int. Cl.
    *F16C 32/06* (2006.01)
(52) U.S. Cl.
    CPC ................................ *F16C 32/0614* (2013.01)

(58) Field of Classification Search
    CPC .............. F16C 32/0614; F16C 32/0618; F16C 32/0622
    See application file for complete search history.

(56) References Cited

U.S. PATENT DOCUMENTS

| | | | | |
|---|---|---|---|---|
| 9,784,312 | B1* | 10/2017 | Gu | ...................... F16C 32/0685 |
| 2025/0198458 | A1* | 6/2025 | Ke | ...................... F16C 32/0603 |
| 2025/0198460 | A1* | 6/2025 | Ke | ...................... F16C 32/0662 |

FOREIGN PATENT DOCUMENTS

| | | |
|---|---|---|
| CN | 1077781 A | 10/1993 |
| CN | 104632893 A | 5/2015 |
| CN | 105805160 A | 7/2016 |

(Continued)

*Primary Examiner* — James Pilkington

(74) *Attorney, Agent, or Firm* — Young Basile Hanlon & MacFarlane, P.C.

(57) ABSTRACT

A self-dehumidifying hydrostatic gas bearing, bearing that includes: a bearing seat, a rotary shaft, a magnetic component, and a throttling vaporization structure. A cavity is provided inside the bearing seat and an inlet pipe is provided on an outer surface of the bearing seat. The rotary shaft passes through the bearing seat. The magnetic component is sleeved on the outside of the rotary shaft. The throttling vaporization structure is provided inside the cavity. A first gap is provided between the throttling vaporization structure and the magnetic component. The throttling vaporization structure is configured to throttle and cool the working medium entering the cavity, and to heat and vaporize the working medium by generating eddy current by using magnetic field induction after cooling the working medium.

9 Claims, 2 Drawing Sheets

(56)  References Cited

FOREIGN PATENT DOCUMENTS

| CN | 105871101 A | 8/2016 | |
|----|-------------|--------|---|
| CN | 110848259 A | 2/2020 | |
| CN | 114221518 A | 3/2022 | |
| CN | 216554974 U | 5/2022 | |
| CN | 216951298 U | 7/2022 | |
| DE | 2108828 B2 | 6/1972 | |
| EP | 0061016 A1 * | 9/1982 | .......... F16C 32/0622 |
| JP | H1113761 A | 1/1999 | |

* cited by examiner

42

SELF-DEHUMIDIFYING HYDROSTATIC GAS BEARING

CROSS-REFERENCE TO RELATED DISCLOSURES

This disclosure claims priority to Chinese Patent Application No. 2023117260700, filed on Dec. 14, 2023, entitled "Self-Dehumidifying Hydrostatic Gas Bearing", which is hereby incorporated by reference in its entirety.

TECHNICAL FIELD

The present disclosure relates to a technical field of bearing, particularly relates to a self-dehumidifying hydrostatic gas bearing.

BACKGROUND

Bearings are one of the key components of power machinery. Hydrostatic gas bearings have a strong capacity in bearing loads and may use high-pressure gas internally from a power system as the working medium of bearing. The working medium is more compatible with the system, and compared to traditional oil-lubricated bearings, the need for an oil supply system may be eliminated, losses due to friction in the bearing may be reduced, and the power system may be simplified with energy efficiency improved. In some power systems, such as a steam system of nuclear power plants, steam may liquefy to form water droplets during throttling expansion. When such working media are used as the gas supply for hydrostatic gas bearings, gas pressure and temperature decrease during throttling in the hydrostatic gas bearing and thus the gas may be liquefied, so that a two-phase mixture of gas and liquid may enter bearing clearance, and it is difficult for the bearing to operate reliably.

BRIEF SUMMARY

The present disclosure provides a self-dehumidifying hydrostatic gas bearing to address problems in the prior art where two-phase mixtures of gas and liquid liquefy to form water droplets during throttling expansion, so that it is difficult for the bearing to operate reliably.

The present disclosure provides a self-dehumidifying hydrostatic gas bearing, including: a bearing seat, a cavity is provided inside the bearing seat and an inlet pipe is provided on an outer surface of the bearing seat and communicates with the cavity; a rotary shaft, passing through the bearing seat; a magnetic component, sleeved on the outside of the rotary shaft and configured to generate a magnetic field when the rotary shaft rotates; a throttling vaporization structure provided inside the cavity, with a first gap provided between the throttling vaporization structure and the magnetic component to form an exhaust channel through the bearing seat. The throttling vaporization structure is configured to throttle and cool the working medium entering the cavity, and to heat and vaporize the working medium by generating eddy current by using magnetic field induction after cooling the working medium. The exhaust channel is configured to discharge the gas.

According to the self-dehumidifying hydrostatic gas bearing provided by the present disclosure, the throttling vaporization structure includes: a plurality of annular throttling elements and a plurality of annular vaporization elements interleaved with one another; the inlet pipe is adjacent to a first annular throttling element, and the magnetic component is adjacent to a last annular throttling element, with the first gap provided between the last annular throttling element and the magnetic component.

According to the self-dehumidifying hydrostatic gas bearing provided by the present disclosure, a second gap is provided between the first annular throttling element and an inner wall of the bearing seat to act as an inlet channel communicating with the inlet pipe.

According to the self-dehumidifying hydrostatic gas bearing provided by the present disclosure, each annular throttling element is a non-metallic annular throttling element made of a porous material to throttle and cool the working medium.

According to the self-dehumidifying hydrostatic gas bearing provided by the present disclosure, each annular vaporization element is a metallic annular vaporization element with a plurality of first holes on a surface thereof, and configured to generate eddy current with magnetic field to heat and vaporize the working medium after being cooled.

According to the self-dehumidifying hydrostatic gas bearing provided by the present disclosure, the annular vaporization element is a metal mesh.

According to the self-dehumidifying hydrostatic gas bearing provided by the present disclosure, each annular vaporization element includes at least one layer of the metal mesh. In a case that the metal mesh is in multiple layers, the multiple layers of metal mesh are stacked with their grids staggered.

According to the self-dehumidifying hydrostatic gas bearing provided by the present disclosure, grids of adjacent metal meshes are in different shapes.

According to the self-dehumidifying hydrostatic gas bearing provided by the present disclosure, the self-dehumidifying hydrostatic gas bearing further includes a sheath, sleeved on the outside of the magnetic component.

According to the self-dehumidifying hydrostatic gas bearing provided by the present disclosure, the bearing seat includes an annular member and a pair of end caps. The pair of end caps are respectively provided at both ends of the annular member. Each of the end caps is provided with a second hole, through which the rotary shaft is disposed. A diameter of the second hole is larger than a diameter of the magnetic component, so that the exhaust channel is provided therein.

The self-dehumidifying hydrostatic gas bearing provided by the present disclosure may decrease the temperature and pressure of the working medium utilizing a throttling effect with the magnetic component and the throttling vaporization structure, and vaporize a part in liquid phase in the working medium to be in gas phase with a principle of electromagnetic induction, so that liquid can be prevented from entering the first gap during operation of a hydrostatic gas bearing, which would otherwise lead to unstable operation of the hydrostatic gas bearing, and the operation reliability of the hydrostatic gas bearing may be improved.

BRIEF DESCRIPTION OF THE DRAWINGS

For better clarification of the technical solutions in the embodiments or the prior art, brief introduction is made below on the drawings used in explaining the embodiments or the prior art. It is obvious that the drawings in the following description are only some embodiments of the present disclosure. For one skilled in the art, other drawings are obtainable based on these drawings without inventive effort.

REFERENCE NUMERALS

10: bearing seat: 11: annular member; 12: end cap; 20: rotary shaft: 30: magnetic component: 41: annular throttling element: 42: annular vaporization element: 50: inlet pipe; 60: sheath: 101: first gap: 102: second gap.

DETAILED DESCRIPTION

To better clarify objectives, technical solutions, and advantages of the present disclosure, technical solutions in the present disclosure will be clearly and thoroughly described below in conjunction with the drawings. It is obvious that the described embodiments are some of the embodiments of the present disclosure, but not all of them. Based on the embodiments of the present disclosure, all other embodiments obtained by skilled in the art without creative efforts shall fall within the scope of the present disclosure.

The terms "first" and "second" in the specification and claims of the present disclosure may explicitly or implicitly include one or more of such features. In the description of the present disclosure, unless otherwise specified, the term "a plurality of" or "multiple" means two or more.

The self-dehumidifying hydrostatic gas bearing of the present disclosure is described below in conjunction with FIGS. 1 and 2.

Figure 1:
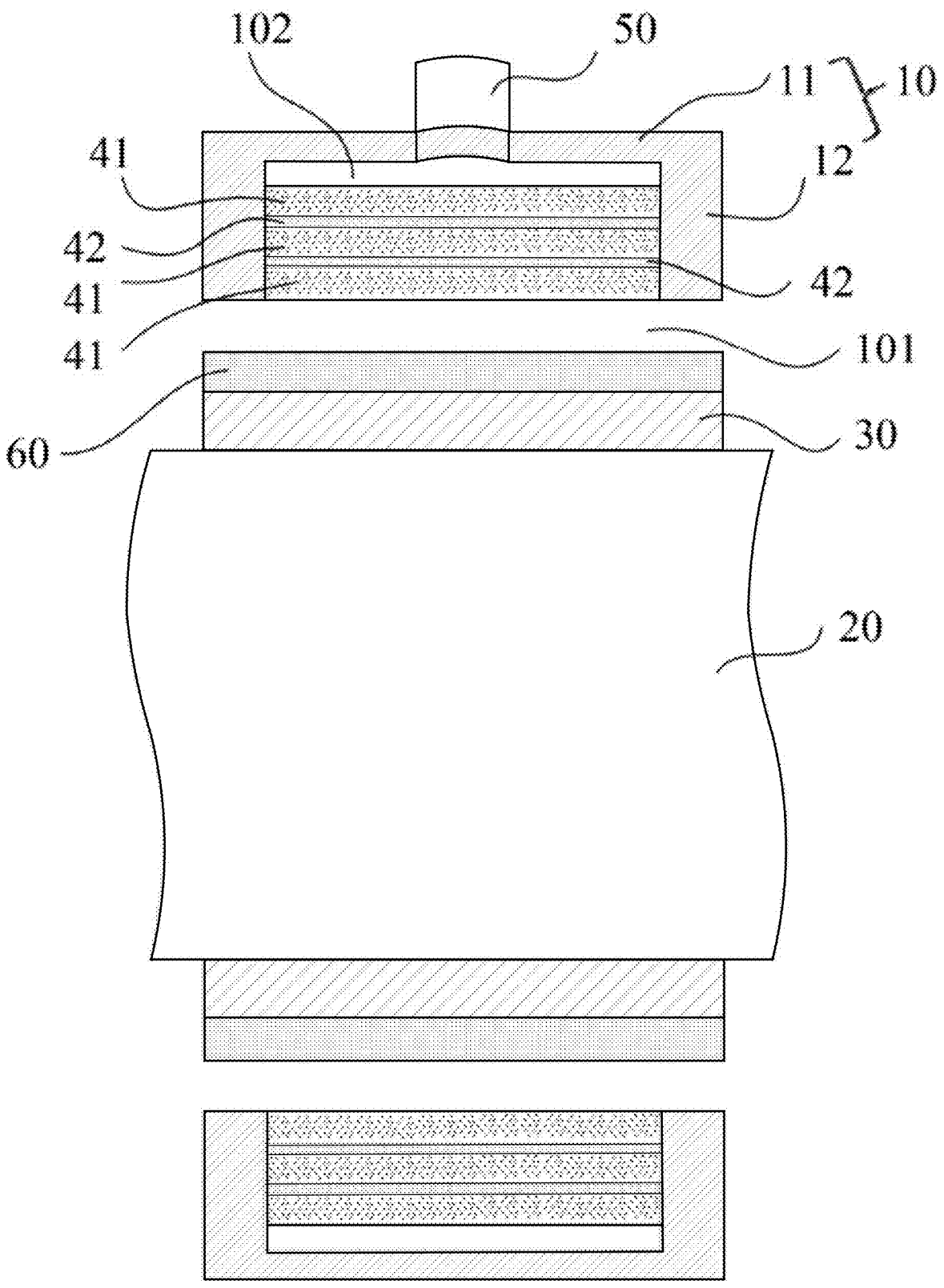
FIG. 1 is a schematic structural diagram of the self-dehumidifying hydrostatic gas bearing provided by the present disclosure.

As shown in FIG. 1, an embodiment of the present disclosure provides a self-dehumidifying hydrostatic gas bearing, including: a bearing seat 10, a rotary shaft 20, a magnetic component 30, and a throttling vaporization structure. A cavity is provided inside the bearing seat 10 and an inlet pipe 50 is provided on an outer surface of the bearing seat 10 and communicates with the cavity. The rotary shaft 20 passes through the bearing seat 10. The magnetic component 30 is sleeved on the outside of the rotary shaft 20 and configured to generate a magnetic field when the rotary shaft 20 rotates. The throttling vaporization structure is provided inside the cavity. A first gap 10 is provided between the throttling vaporization structure and the magnetic component 30. The first gap 101 passes through the bearing seat 10 to form (e.g., define) an exhaust channel extending through the bearing seat 10 (e.g., extending from the cavity to an exterior of the bearing seat 10). The throttling vaporization structure is configured to throttle and cool the working medium entering the cavity, and to heat and vaporize the working medium by generating eddy current by using magnetic field induction after cooling the working medium. The exhaust channel is configured to discharge the gas.

Specifically, when the rotary shaft 20 rotates, it may drive the magnetic component 30 to rotate so as to generate a magnetic field. The inlet pipe 50 is configured to transport the working medium into the cavity of the bearing seat 10. In this embodiment, the working medium is a gas-phase working medium that is easily liquefied or a working medium in two phases of liquid and gas. The throttling vaporization structure has a layered structure. When the working medium passes through the throttling vaporization structure, a throttling effect is generated so that the pressure and temperature of the working medium may be decreased. The throttling vaporization structure may generate eddy current by induction under a magnetic field to heat and vaporize a part in liquid phase in the working medium to be in a gas phase, which is then discharged through the exhaust channel, so that automatic dehumidification may be achieved during the operation of the hydrostatic gas bearing and liquid can be prevented from entering the first gap 101 during operation of a hydrostatic gas bearing, which would otherwise lead to unstable operation of the hydrostatic gas bearing.

Further, in an embodiment of the present disclosure, the magnetic component 30 is an annular permanent magnet. When the rotary shaft 20 rotates, it may drive the magnetic component 30 to rotate to generate a magnetic field. The throttling vaporization structure may generate eddy current with a principle of electromagnetic induction so as to heat and vaporize the part in liquid phase in the working medium.

Furthermore, in an embodiment of the present disclosure, a plurality of inlet pipes 50 are sequentially disposed along a circumferential surface of the bearing seat 10.

The self-dehumidifying hydrostatic gas bearing provided according to embodiments of the present disclosure may decrease the temperature and pressure of the working medium utilizing a throttling effect with the magnetic component and the throttling vaporization structure, and vaporize a part in liquid phase in the working medium to be in gas phase with a principle of electromagnetic induction, so that liquid can be prevented from entering the first gap during operation of a hydrostatic gas bearing, which would otherwise lead to unstable operation of the hydrostatic gas bearing, and the operation reliability of the hydrostatic gas bearing may be improved.

Furthermore, in an embodiment of the present disclosure, the throttling vaporization structure includes: a plurality of annular throttling elements 41 and a plurality of annular vaporization elements 42. The plurality of annular throttling elements 41 and the plurality of annular vaporization elements 42 are interleaved with one another. The inlet pipe 50 is adjacent to a first annular throttling element 41, and the magnetic component 30 is adjacent to a last annular throttling element 41. The first gap 101 is provided between the last annular throttling element 41 and the magnetic component 30.

More particularly, in the embodiment, the plurality of annular throttling elements 41 and the plurality of annular vaporization elements 42 are interleaved with one another so as to form a multi-layer throttling structure and a multi-layer vaporization structure. As the working medium passes through each layer of the throttling structure, its temperature and pressure are decreased, while as it passes through each layer of the vaporization structure, the part in liquid phase in the working medium is vaporized, so that the working medium are totally in gas phase, and thus liquid is prevented from entering the first gap 101. Moreover, during flowing of the working medium, the working medium is under the process of cooling and heating for many times so that an effect on the lifespan due to excessively high temperatures on parts of the hydrostatic gas bearing may be avoided.

In the self-dehumidifying hydrostatic gas bearing provided by the embodiment of the present disclosure, the plurality of annular throttling elements and the plurality of annular vaporization elements are interleaved with one another, so that the working medium undergoes cooling and pressure reduction for multi-times during flowing, and a normal pressure of the hydrostatic gas bearing may be ensured without the impact on the lifespan of the hydrostatic gas bearing from excessively high temperatures of local parts of the hydrostatic gas bearing. At least all parts in liquid phase in the working medium (e.g., a liquid phase portion) may be vaporized to be in a gas phase after the working medium passes through each annular vaporization element, so that the working medium are totally in gas phase, and thus liquid is prevented from entering the first gap of the hydrostatic gas bearing. The operation reliability of the hydrostatic gas bearing may be ensured.

As shown in FIG. 1, in the embodiment of the present disclosure, a second gap 102 may be formed between the first annular throttling element 41 and an inner wall of the bearing seat 10. The second gap 102 may act as an inlet channel, which communicates with the inlet pipe 50.

More particularly, as shown in FIG. 1, in the embodiment of the present disclosure, the bearing seat 10 includes: an annular member 11 and a pair of end caps 12. The pair of end caps 12 are respectively provided at both ends of the annular member 11. Each end cap 12 is provided with a second hole, through which the rotary shaft 20 passes. A diameter of the second hole is larger than that of the magnetic component 30 so that the exhaust channel is provided in the clearance therein.

More particularly, the pair of end caps 12 are respectively provided at both ends of the annular member 11, so that a cavity may be provided inside the bearing seat 10. The annular throttling elements 41 and the annular vaporization elements 42 are interleaved with one another in the cavity. A second gap 102 is formed between the annular throttling element 41 and the annular member 11 to act as an inlet channel. Two end faces of the magnetic component 30 are flush with the two end caps 12, and the diameter of the magnetic component 30 is smaller than that of the second hole, so that a first gap 101 is provided between the magnetic component 30 and the last annular throttling element 41. The first gap 101 is configured to discharge the working medium totally in gas phase.

As shown in FIG. 1, in the embodiment of the present disclosure, each annular throttling element 41 is a non-metallic annular throttling element made of a porous material, and is configured to throttle and cool the working medium. Each annular vaporization element 42 is a metallic annular vaporization element with a plurality first holes on its surface, and is configured to generate eddy current under the magnetic field to heat and vaporize the working medium after cooling.

Specifically, in the embodiment, the annular throttling element 41 is made of a porous material, specifically a relatively loose non-metallic material. When the working medium, which is in gas phase but easily liquefied or working medium in two phases of liquid and gas passes through the annular throttling element 41, the pressure and temperature of the working medium may be decreased due to throttling effect by the small holes, possibly with liquid generated. The working medium flows to the annular vaporization element 42, which, being electrically conductive and under the action of the magnetic field, induces eddy current so that the working medium may be heated by the eddy current, and the part in liquid phase may be vaporized to be in a gas phase and the working medium is further heated to be above its saturation temperature, while the pressure of the working medium remains essentially unchanged. The working medium then flows to the annular throttling element 41 again, where the pressure and temperature of the working medium may be further decreased due to the throttling effect of the small holes, with part in gas phase possibly liquefied to be in liquid phase. The working medium then flows to the annular vaporization element 42 again, which heats and vaporizes the liquid in the working medium, so that the working medium is in a total gas phase. With such configuration, the pressure of the working medium may continuously decrease as it passes through the plurality of annular throttling elements 41 and the plurality of annular vaporization elements 42, so that the operational requirements of the hydrostatic gas bearing may be met.

Optionally, the porous material may be porous ceramics, carbon materials, etc.

When the working medium flows to the last annular vaporization element 42, since this annular vaporization element 42 is closest to the magnetic component 30, the heating power of the induced eddy current is the greatest, so that it can be ensured that the working medium remains in a total gas phase after passing through the last annular throttling element 41, and liquid may be prevented from entering the first gap 101.

Furthermore, in the embodiment shown in FIG. 1, the number of annular throttling elements 41 may be three, and the number of annular vaporization elements 42 may be two. After the working medium passes through the second annular vaporization element 42, it should have a higher temperature, so that the working medium does not liquefy even if its temperature decreases after passing through the third annular throttling element 41, so as to remain a total gas state.

Moreover, in the embodiment of the present disclosure, the thicker the annular throttling element 41 is, the more pronounced the throttling effect would be, when the working medium passes through the annular throttling element 41, and the temperature and pressure of the working medium may be decreased more. Therefore, the thickness of the annular throttling element 41 may be adjusted based on the specific type of working medium to cool and depressurize high-temperature high-pressure working media.

Furthermore, in the embodiment of the present disclosure, the diameter of the small holes in the annular throttling element 41 should be as small as possible to increase the flow resistance of the working medium, and decrease the temperature and pressure of the working medium.

Additionally, the number of annular throttling elements 41 and annular vaporization elements 42 is related to a pressure required for the operation of the hydrostatic gas bearing. The number of annular throttling elements 41 may be adjusted based on the pressure-decreasing effect achieved thereby to ensure that the pressure of the working medium meets the design requirements of the hydrostatic gas bearing.

Furthermore, in the embodiment, the annular throttling element 41 is made of non-metallic material to prevent eddy current from being generated thereby under electromagnetic induction, which would otherwise negate its pressure-decreasing and cooling effects.

Figure 2:
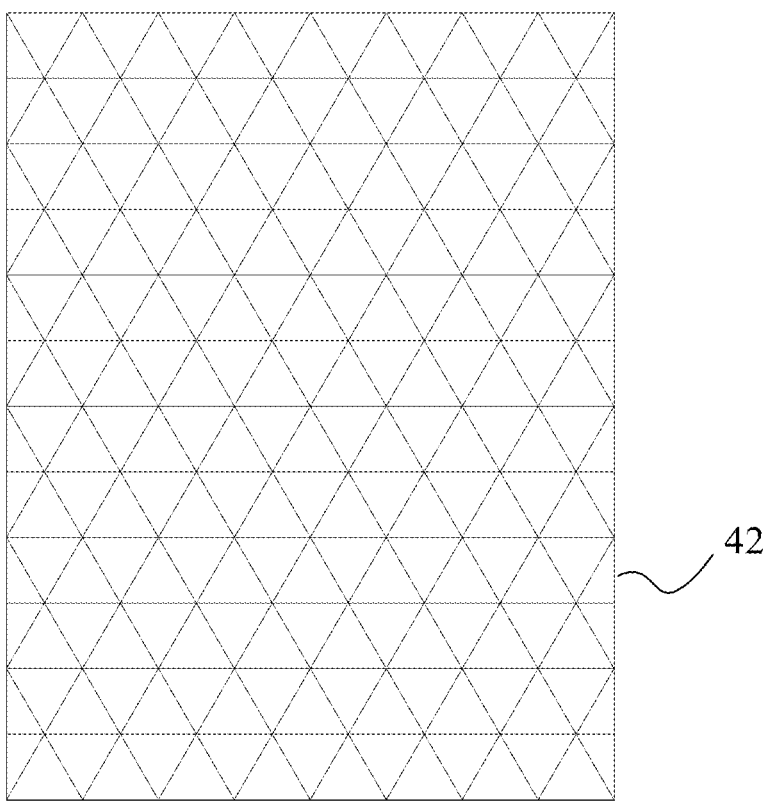
FIG. 2 is a schematic structural diagram of the annular vaporization element shown in FIG. 1.

As shown in FIG. 2, in the embodiment of the present disclosure, the annular vaporization element 42 is a metal mesh. When the working medium passes through the metal mesh, the contact area between the working medium and the metal mesh is large, i.e., the total heating area of the working medium is large, and the working medium may be under an even heating so as to remove part in liquid phase in the working medium effectively.

Moreover, each annular vaporization element 42 may be a single layer of metal mesh or multiple layers of metal mesh. When the metal mesh is multiple layers of metal mesh, the layers may be stacked to increase the heating power, so as to ensure the vaporization effect for liquid phase.

Furthermore, in the embodiment of the present disclosure, the shape of mesh of the metal mesh may be triangular, circular, or rectangular, among which the triangular mesh is preferred. The triangular mesh may further increase a contact area between the working medium and the metal mesh, so as to increase the heating area for the working medium and improve the vaporization effect.

The self-dehumidifying hydrostatic gas bearing provided by the embodiment of the present disclosure may increase the heating area for the working medium so that the working medium may be heated evenly, and the part in liquid phase in the working medium may be removed effectively by providing the annular vaporization element in a form of metal mesh.

Additionally, when the metal mesh is multiple layers of metal mesh, the meshes (e.g., grids) of the multiple layers may be staggered to improve density of the metal meshes. There is still metal wire present even at the voids in the mesh, and thus the working medium may contact the metal wire of the mesh of lower layer when passing through the mesh of upper layer, so that the working medium may be heated again to ensure the vaporization effect on the working medium.

Furthermore, when multiple layers of metal mesh are stacked, the shapes of meshes of adjacent layers may be different so that the density of the mesh may be improved.

The self-dehumidifying hydrostatic gas bearing provided by the embodiment of the present disclosure may further increase the area for heating the working medium by stacking multiple layers of metal mesh and staggering the meshes of the multiple layers, so that the working medium may be further heated during flowing, and the vaporization effect on the working medium may be improved.

As shown in FIG. 1, in the embodiment of the present disclosure, the self-dehumidifying hydrostatic gas bearing further includes a sheath 60, which is provided outside the magnetic component 30.

Specifically, the sheath 60 is sleeved on the outside of the magnetic component 30 to prevent the working medium from contacting the magnetic component 30.

The self-dehumidifying hydrostatic gas bearing provided by the embodiment of the present disclosure has a compact structure, with the original structure of the bearing fully used, generate eddy current in the metal meshes provided between the multiple layers of annular throttling elements with a principle of electromagnetic induction when the rotary shaft rotates so that a part in liquid phase of the working medium may be heated and automatic dehumidification during operation is achieved without additional heating equipment, and the manufacturing cost of the hydrostatic gas bearing is decreased. On the other hand, the self-dehumidifying hydrostatic gas bearing provided by the embodiment of the present disclosure has a good dehumidification effect, with a relatively low maximum temperature of the working medium. The throttling and heating process of the working medium is divided into multiple stages, and the working medium may be cooled through the annular throttling element and then heated through the dense metal mesh in each stage. The overall heating area is large and the heating may be performed evenly, so that the part in liquid phase of the working medium may be removed effectively. Moreover, in the entire process, the working medium undergoes multiple stages of cooling and heating, so that the impact on the service life of the bearing due to excessively high temperatures of local parts of the bearing may be avoided.

It should be noted that the above embodiments are only used to illustrate the technical solutions of the present disclosure, and not to limit them. Although the present disclosure has been described in detail with reference to the aforementioned embodiments, one skilled in the art should understand that modification may still be made on the technical solutions as described in the foregoing embodiments, or equivalent replacements may be made for some of the technical features. These modifications or replacements shall not drive the technical solutions corresponding thereto off the spirit and scope of the technical solutions of the embodiments of the present disclosure.

The invention claimed is:

1. A self-dehumidifying hydrostatic gas bearing, comprising:

a bearing seat, wherein a cavity is provided inside the bearing seat and an inlet pipe is provided on an outer surface of the bearing seat and communicates with the cavity, and wherein the bearing seat defines an exhaust channel extending from the cavity to an exterior of the bearing seat;

a rotary shaft passing through the bearing seat;

a magnetic component that is sleeved on an outside of the rotary shaft and configured to generate a magnetic field when the rotary shaft rotates; and a throttling vaporization structure provided inside the cavity, wherein the throttling vaporization structure comprises a plurality of annular throttling elements and a plurality of annular vaporization elements interleaved with one another, wherein:

the inlet pipe is adjacent to a first annular throttling element, the magnetic component is adjacent to a last annular throttling element, the exhaust channel includes a first gap is that is formed between the last annular throttling element and the magnetic component, the plurality of annular throttling elements are configured to throttle a working medium flowing through the cavity to cool the working medium, the plurality of annular vaporization elements are electrically conductive such that, during rotation of the rotary shaft, eddy currents are induced in the plurality of annular vaporization elements by the magnetic field generated by the magnetic component to heat and vaporize at least a liquid phase portion of a cooled working medium, and the exhaust channel is configured to discharge the working medium in a gas phase.

2. The self-dehumidifying hydrostatic gas bearing according to claim 1, wherein a second gap is provided between the first annular throttling element and an inner wall of the bearing seat to act as an inlet channel communicating with the inlet pipe.

3. The self-dehumidifying hydrostatic gas bearing according to claim 1, wherein each annular throttling element is a non-metallic annular throttling element made of a porous material to throttle and cool the working medium.

4. The self-dehumidifying hydrostatic gas bearing according to claim 1, wherein each annular vaporization element is a metallic annular vaporization element, a plurality of first holes are provided on a surface of the metallic annular vaporization element, and the metallic annular vaporization element is configured to generate eddy current with the magnetic field to heat and vaporize the working medium after the working medium is cooled.

5. The self-dehumidifying hydrostatic gas bearing according to claim 1, wherein the metallic annular vaporization element is a metal mesh.

6. The self-dehumidifying hydrostatic gas bearing according to claim 5, wherein each metallic annular vaporization element comprises one layer or the metal mesh comprises multiple layers of metal that are stacked with their grids staggered.

7. The self-dehumidifying hydrostatic gas bearing according to claim 6, wherein grids of adjacent metal meshes are in different shapes.

8. The self-dehumidifying hydrostatic gas bearing according to claim 1, wherein the self-dehumidifying hydrostatic gas bearing further comprises a sheath sleeved on an outside of the magnetic component.

9. The self-dehumidifying hydrostatic gas bearing according to claim 1, wherein the bearing seat comprises an annular member and a pair of end caps, the pair of end caps are respectively provided at both ends of the annular member, each of the pair of end caps is provided with a second hole through which the rotary shaft is disposed, and a diameter of the second hole is larger than a diameter of the magnetic component, thereby defining at least a portion of the exhaust channel as an annular clearance between the magnetic component and the second hole.

\* \* \* \* \*